Feb. 9, 1943.       H. B. TUTHILL ET AL       2,310,719
WRAPPING MACHINE
Filed Dec. 21, 1938       12 Sheets-Sheet 4

Inventors
Howard B. Tuthill
Harry F. Caldwell
By Pierance and
Van Antwerp
Attorneys Feb. 9, 1943.   H. B. TUTHILL ET AL   2,310,719
WRAPPING MACHINE
Filed Dec. 21, 1938   12 Sheets-Sheet 6

Inventors
Howard B. Tuthill
Harry F. Caldwell
By Liverance and
Van Antwerp
Attorneys

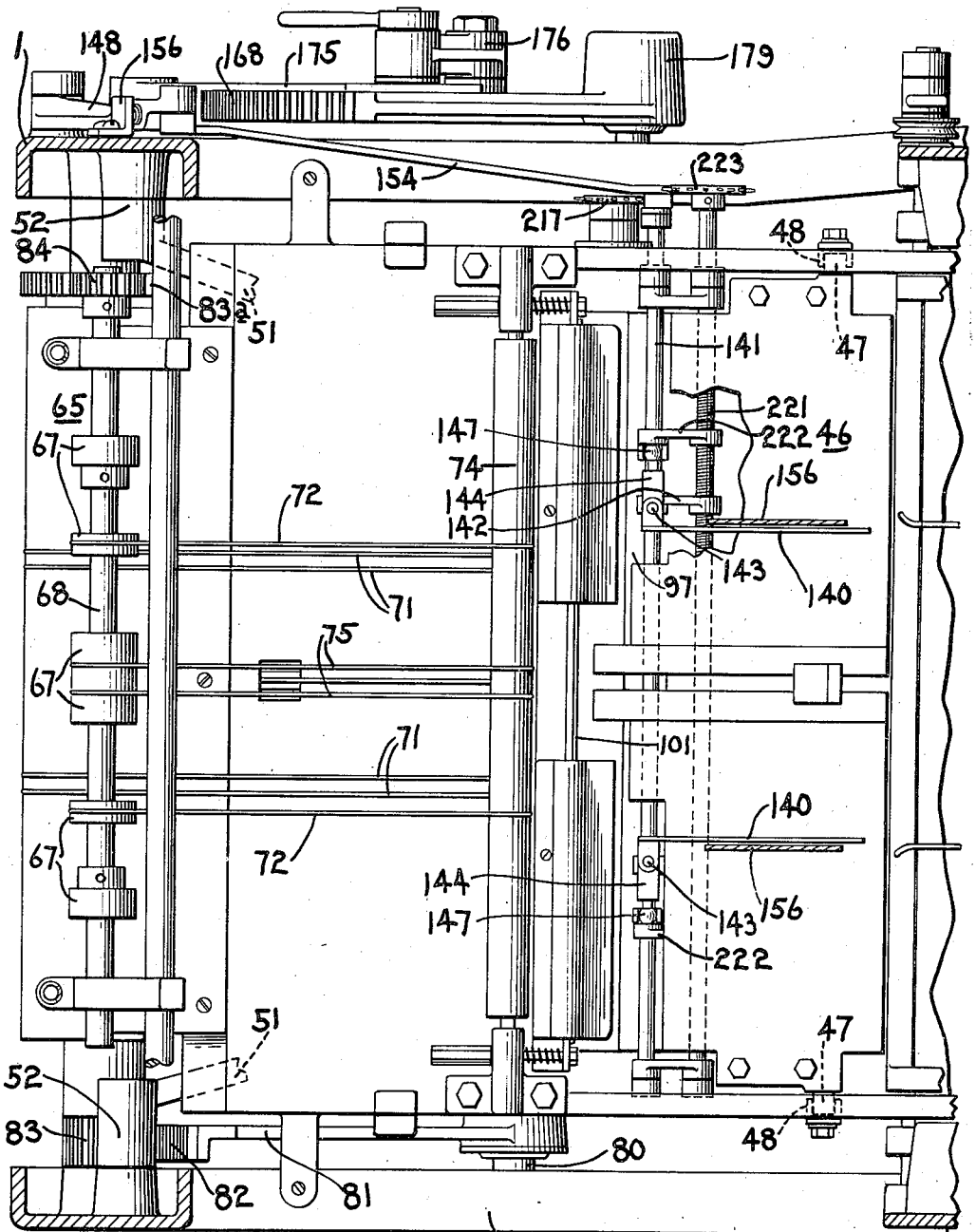

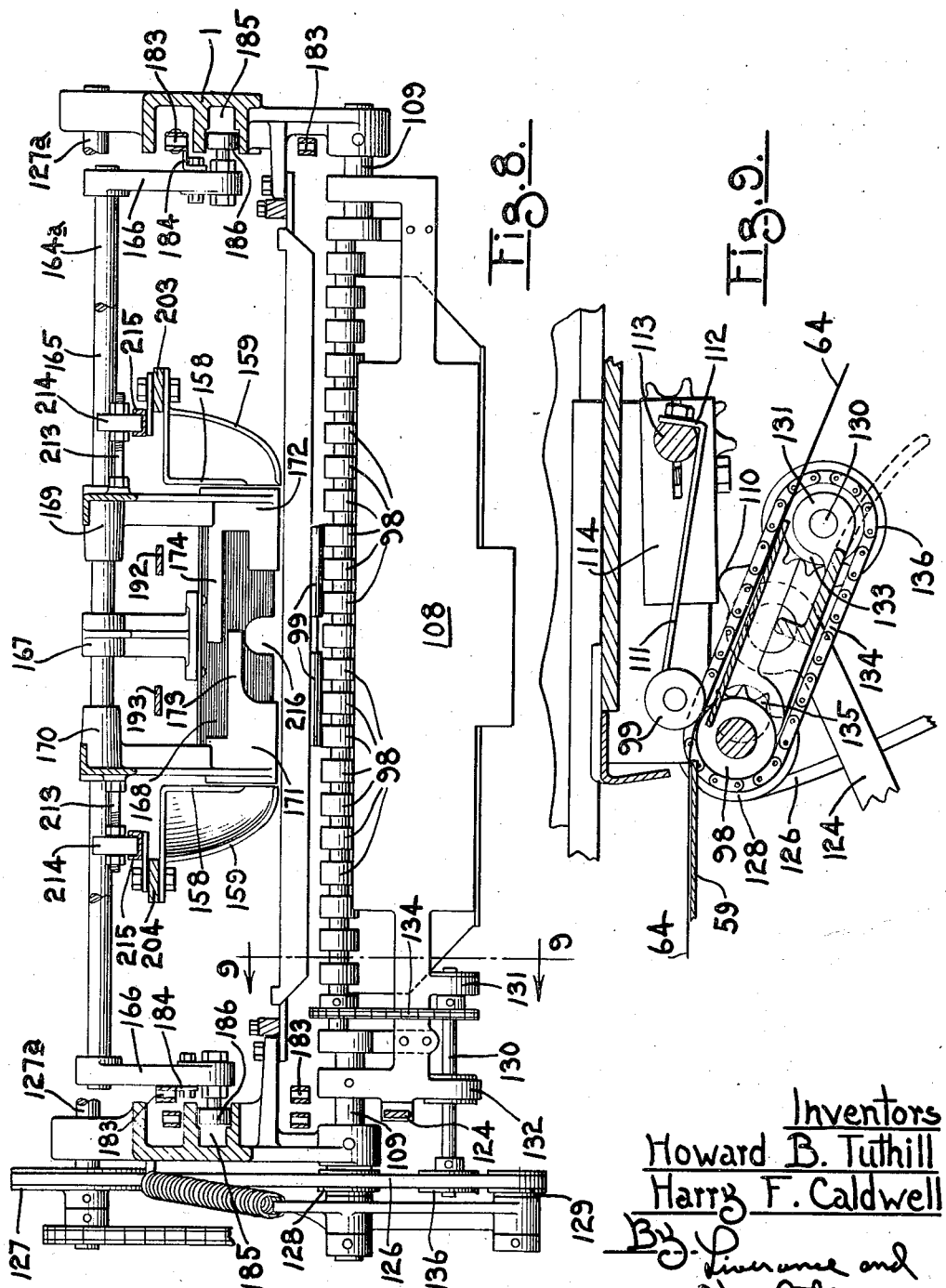

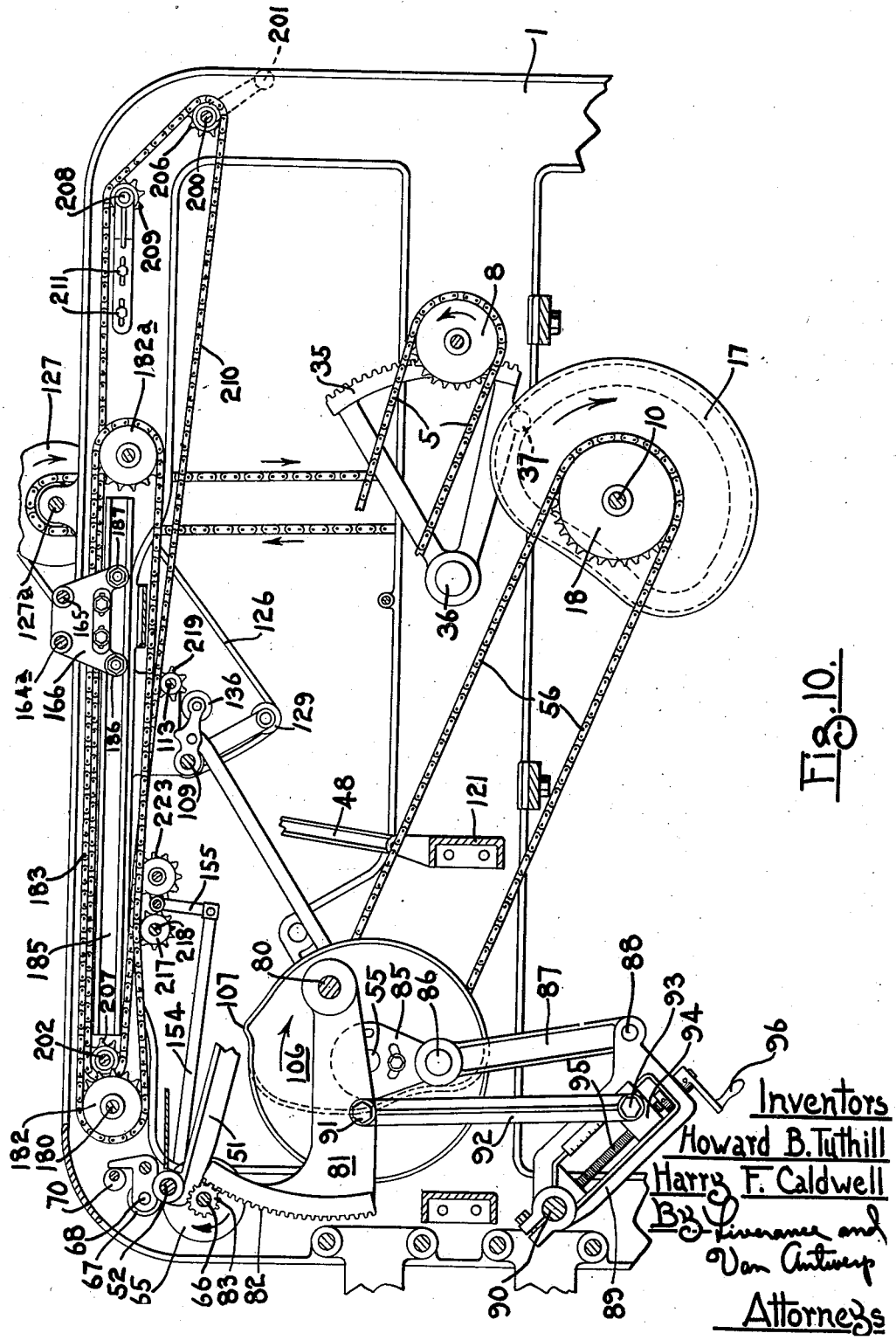

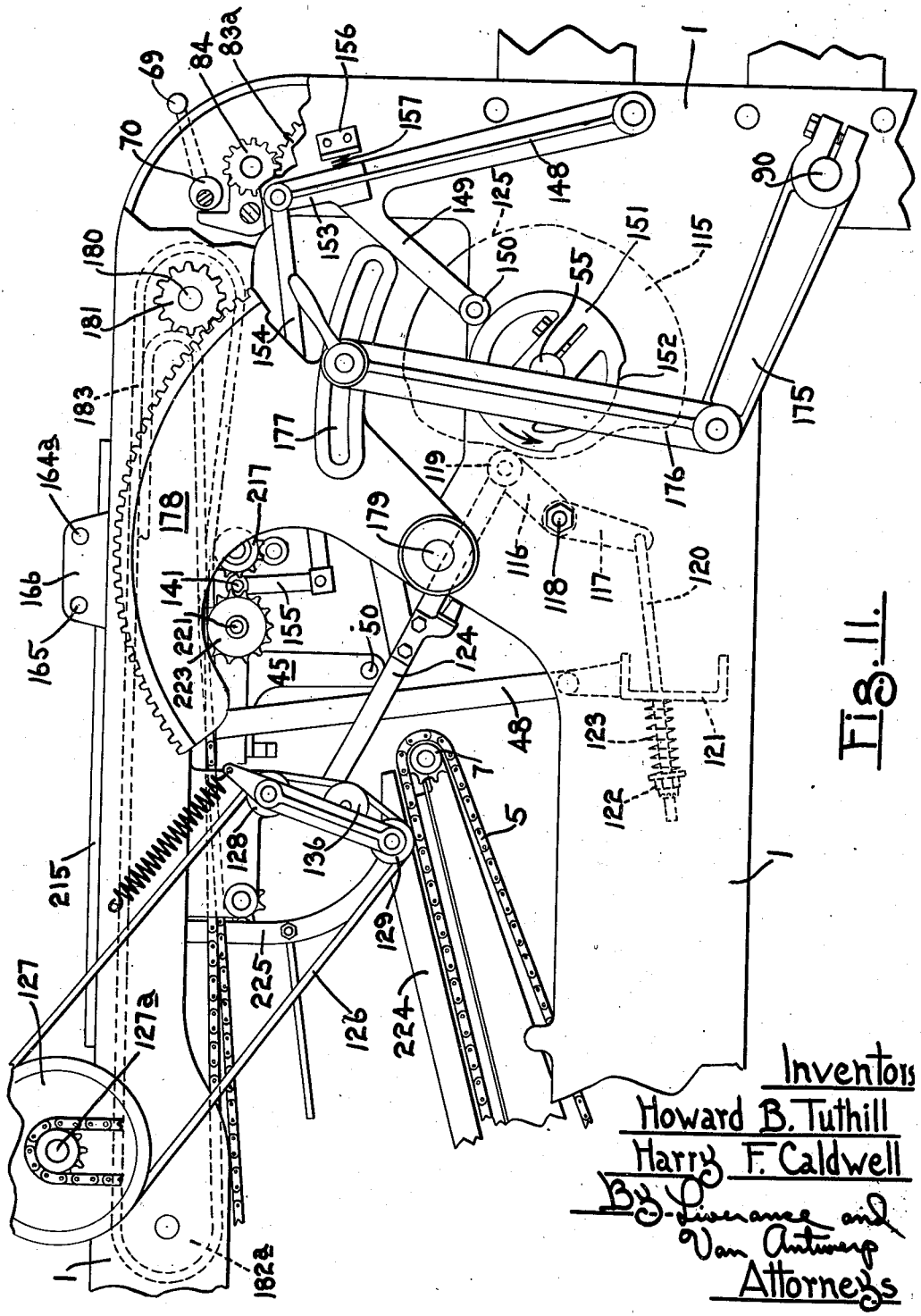

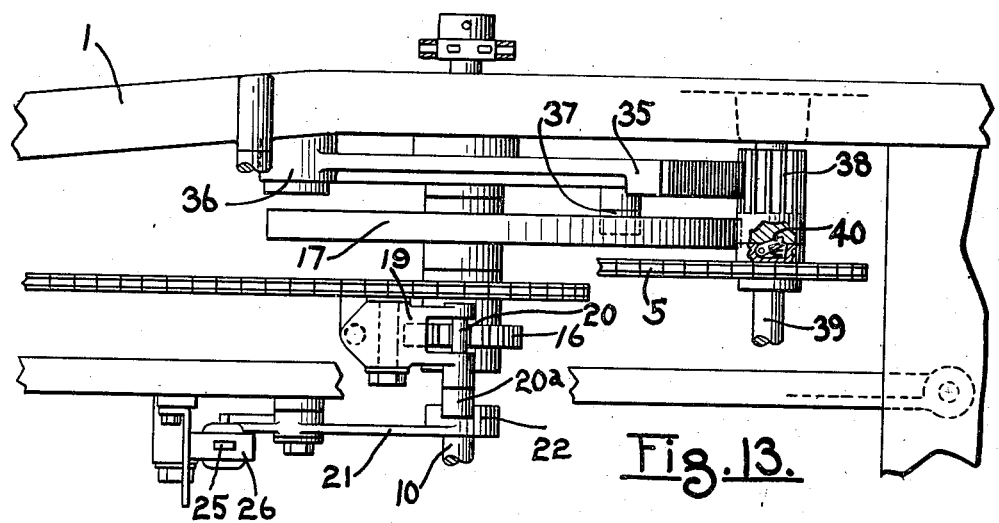
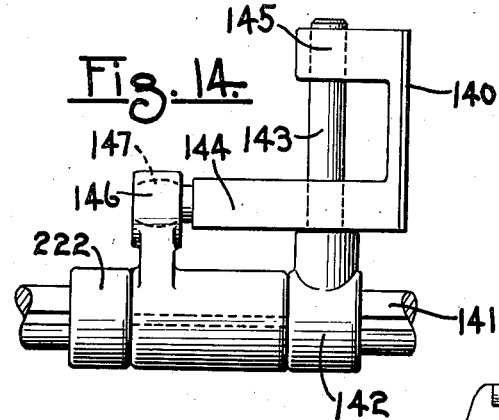
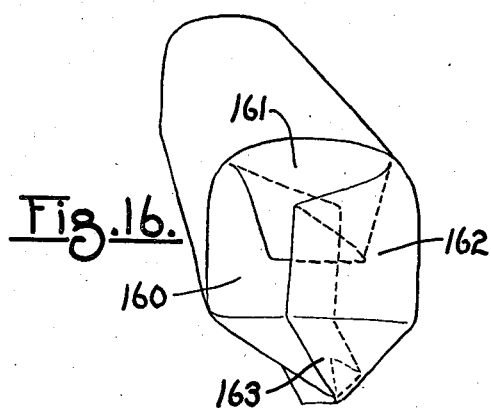
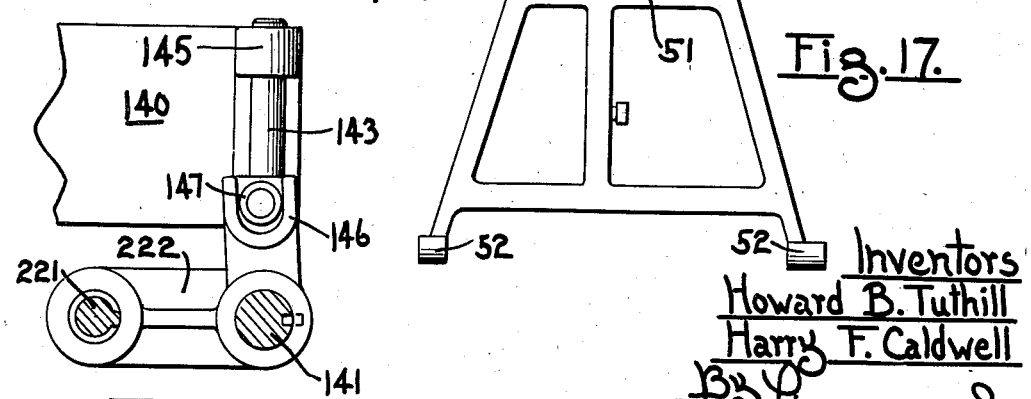
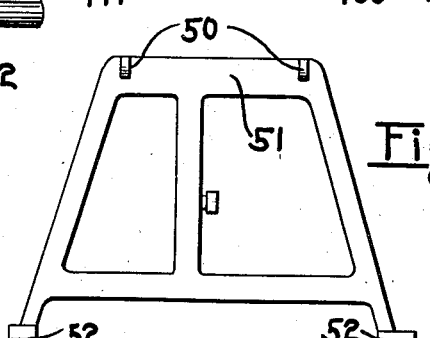

Patented Feb. 9, 1943

2,310,719

UNITED STATES PATENT OFFICE 2,310,719

WRAPPING MACHINE

Howard B. Tuthill and Harry F. Caldwell, Grand Rapids, Mich., assignors, by mesne assignments, to Oliver Machinery Company, Grand Rapids, Mich., a limited partnership of Michigan Application December 21, 1938, Serial No. 247,063

34 Claims. (Cl. 93—2)

This invention relates to wrapping machines. It is particularly adapted to wrap loaves of bread which are somewhat irregular in shape but will also operate to wrap other articles such as packages of uniform shape and size.

The invention provides a machine having many new and useful features such as convenience of arrangement resulting in minimum floor space, speed and accuracy of adjustment to accommodate different sizes, articles, means for adjusting the length of the wrapper while the machine is in operation, means for adjusting the length of time in which the wrapped article is heated for sealing the wrapper, ready accessibility for cleaning and repair, and various other new and useful improvements hereafter more fully described and particularly pointed out in the claims, reference being had to the accompanying drawings in which, Fig. 1 is a side elevation of a wrapping machine embodying this invention having a bread slicing machine atttached thereto.

Fig. 7 is a plan view of the paper feed end of the machine.

Fig. 8 is a cross sectional elevation on the line 8—8 of Figs. 2 and 4 with the pusher moved forward into view.

Fig. 9 is an enlarged fragmentary section illustrating the paper gripper.

Fig. 10 is a longitudinal sectional elevation illustrating the motivating parts and omitting various other parts.

Fig. 11 is an elevation of a part of the side of the machine opposite that shown in Fig. 1 with parts broken away, illustrating various parts of the mechanism.

Fig. 13 is a fragmentary plan view of the driving clutch.

Figs. 14 and 15 are fragmentary elevations of the end tucker mounting means.

Fig. 16 is a perspective view of a partially wrapped package, and

Fig. 17 is a plan view of the elevator casting.

Like reference numerals refer to like parts throughout the various views.

Figure 1:
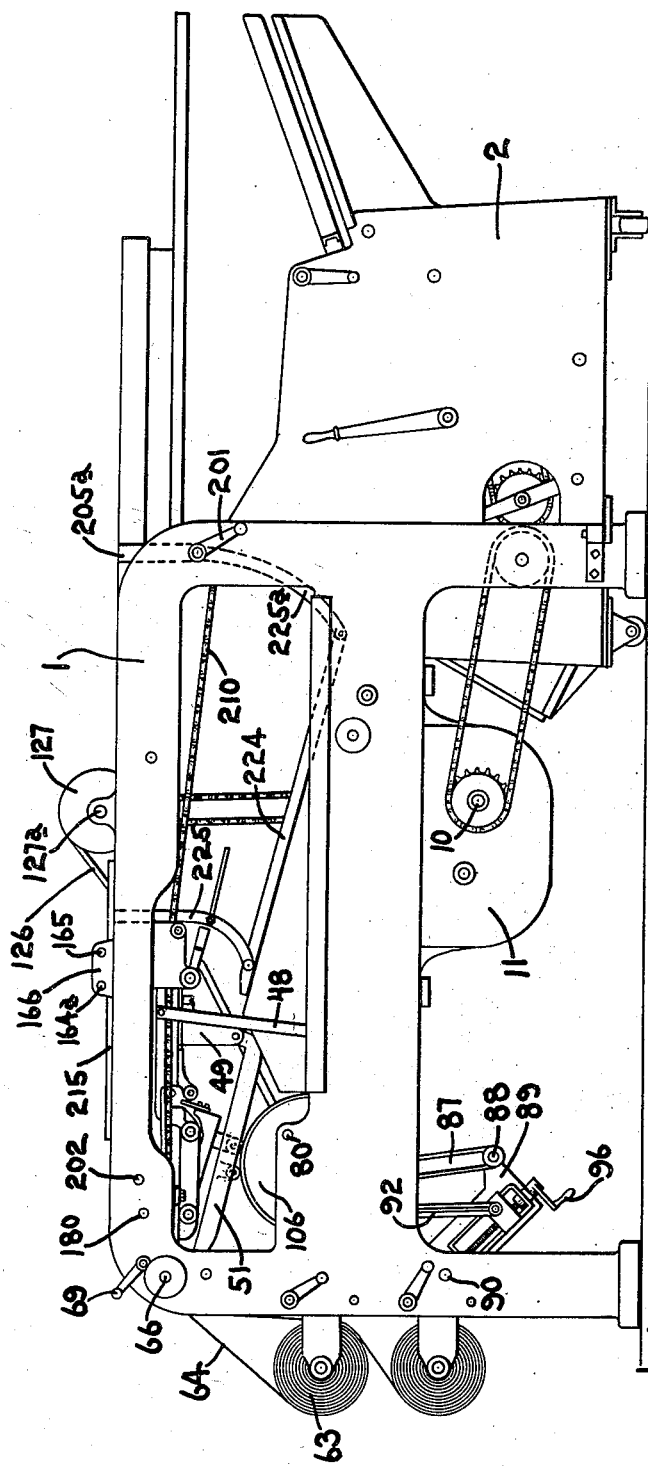

As above stated, the machine may be used to wrap loaves of bread which are somewhat irregular in shape but it is perfectly adapted to wrap other articles such as rectangular packages of uniform shape and size. The articles to be wrapped may be placed by hand into the machine or they may be delivered into the machine by some article preparing device such as a bread slicing machine shown and described in our co-pending patent application filed June 15, 1938, Serial No. 213,806. For the purpose of illustration the said bread slicing machine is illustrated in Fig. 1 as a means for delivering articles into the wrapping machine but such a slicing machine forms no part of the present invention.

The machine has a main frame 1. The bread slicing machine is indicated generally as 2 and has a delivery table 3 from which loaves of bread are deposited into the wrapping machine.

Figure 6:
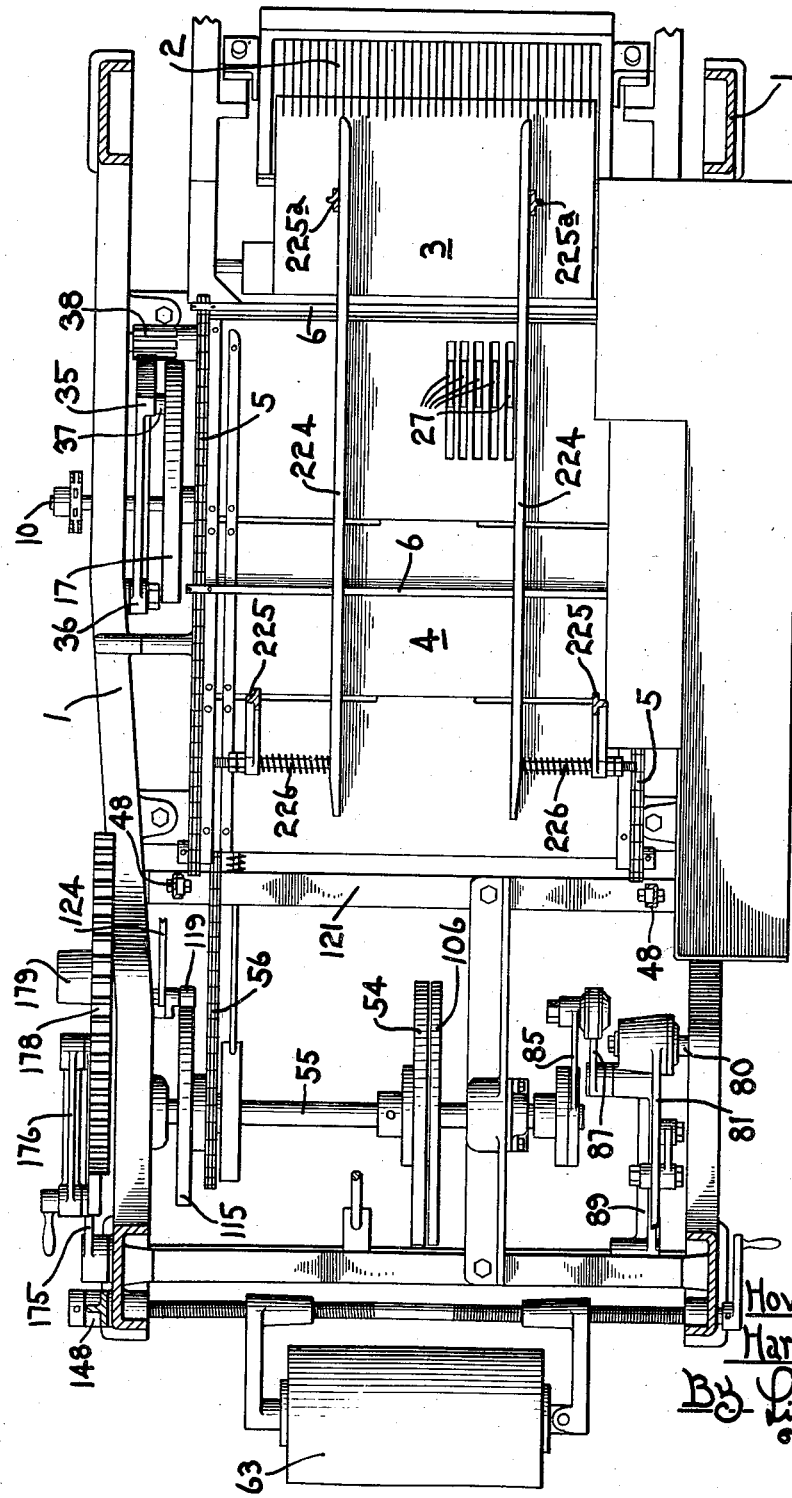
Fig. 6 is a sectional plan of the machine above the infeed conveyor and below the elevator.

In the lower part of the wrapping machine a conveyor is located which comprises a table 4 upon which articles are deposited and endless chains 5 at opposite sides of the table 4 between which extend conveyor bars 6. (Figs. 3 and 6) The chains 5 run over spockets 7 and 8 at the respective ends of the table 4.

Figure 12:
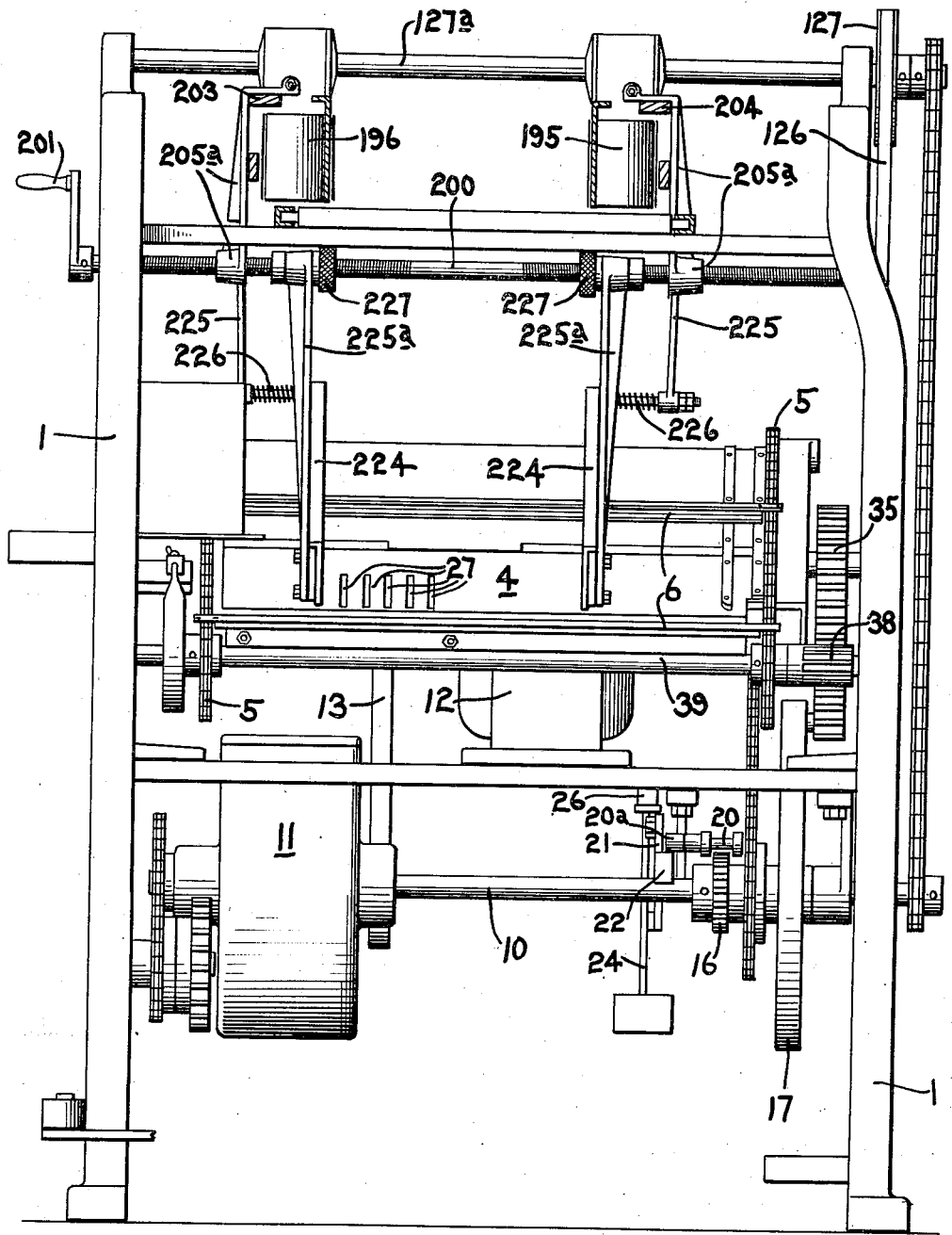
Fig. 12 is an elevation of the infeed end of the machine with a part of the outfeed conveyor removed.

The machine is actuated by a main driving shaft 10 which is constantly rotated from a gear reducing mechanism 11 driven from a suitable source of power such as an electric motor 12 and a belt 13. (Fig. 12.) The mechanism which constitutes the gear reduction mechanism 11 forms no part of this invention, it merely being necessary that the drive shaft 10 be provided with means for continuously rotating it at the proper speed.

Figure 2:
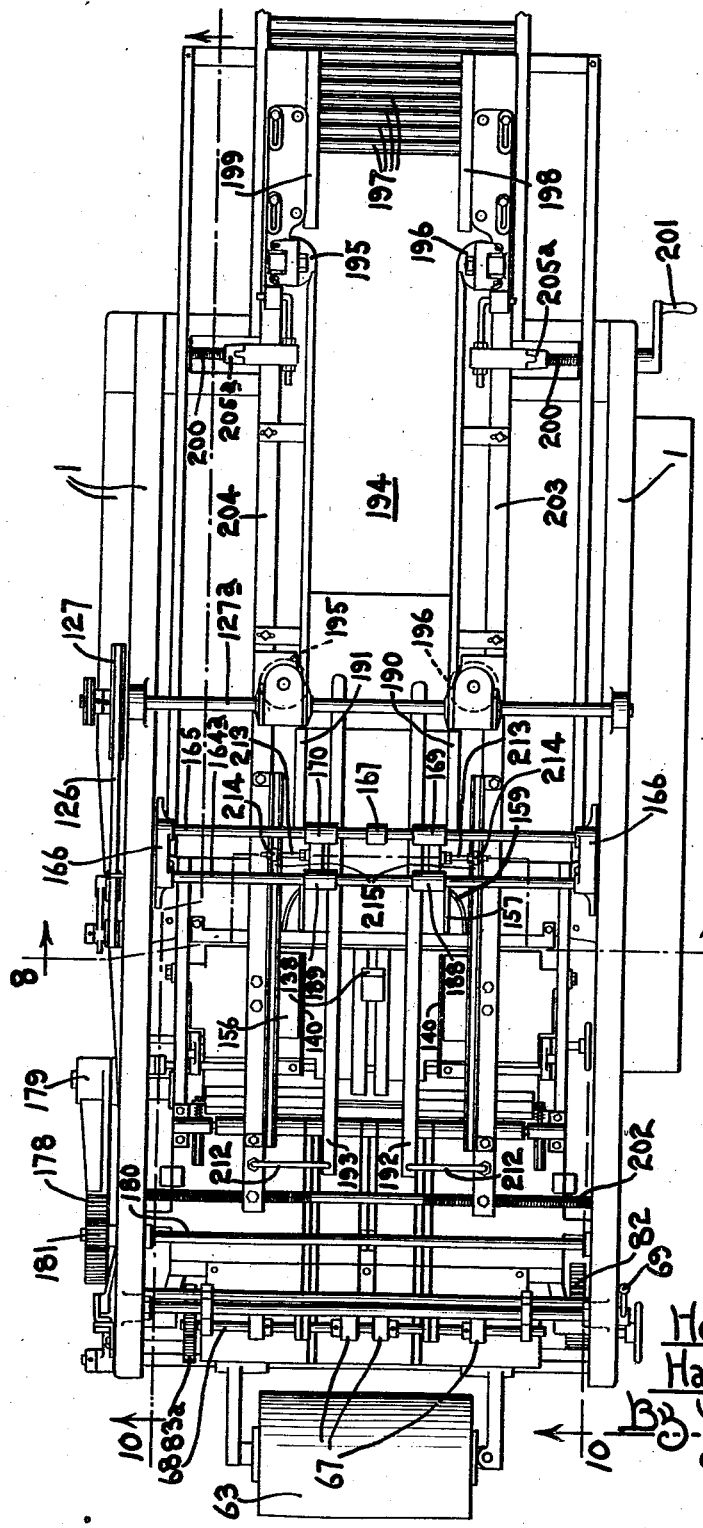
Fig. 2 is a plan view of the wrapping machine.

All parts of the wrapping mechanism excepting the final conveyor belts which carry the wrapped articles from the machine and a certain belt for operating a paper tightening mechanism, are operated through a single cycle clutch 15 which is normally inoperative and when engaged is driven by the shaft 10 (Figs. 2, 13). This clutch 15 comprises a notched disk 16 fixed to the shaft 10. A cam 17 and a sprocket wheel 18, fastened together, are loosely mounted upon the shaft 10 adjacent the disk 16 and an arm 19 is pivotally connected to the sprocket 18 and has a pin 20 which may drop into a notch in the disk 16 thus forming a driving connection between the shaft 10, the sprocket 18 and cam 17.

A bell crank 21 is pivoted to a fixed part of the machine and has a cam 22 on one of its arms which is normally in a position to lift the pin 20 out of engagement with the notched disk 16, a cam roller 20a being provided on the pin to engage the cam. The opposite arm of the bell crank 21 is connected with mechanism by which the cam 22 may be lowered to permit the pin 20 to drop into a notch of the disk 16 causing the driving connection above mentioned.

The mechanism for engaging this clutch comprises toggle levers 23 connecting an arm of the bell crank 21 with a fixed part of the machine. A vertical bar 24 having a weight at its lower end is joined to the middle portion of the toggle levers 23 and extends upwardly where it is connected to the armature 25 of a solenoid magnet 26. The weight on the bar 24 normally holds the toggle levers 23 in extended position moving the bell crank 21 to lift the cam 22 into the path of the cam roller 20a so that it will raise the pin 20 out of engagement with the disk 16 to disengage the clutch.

Trip fingers 27 are pivoted beneath the conveyor table 4 and extend upwardly through it near its entrance edge where they are engaged by articles deposited upon the conveyor and when so engaged the trip fingers 27 will be depressed. A so-called mercury tube contact breaker 28 is attached to the trip finger assembly and is caused to rock as the fingers are moved and it is connected in an electric circuit comprising conductor wires 29 so that when the fingers are depressed the circuit will be closed. These conductor wires carry an electric current from a suitable source to the solenoid magnet 26 which is energized when the circuit is closed. This mercury tube contact breaker or switch is well understood by those skilled in the art and its specific construction and operation needs no description.

By this mechanism an article deposited onto the conveyor table 4 will depress the trip fingers 27, cause the magnet 26 to be energized which will lift its armature 25 and the bar 24 and change the positions of the toggle levers 23 moving the bell crank 21 to lower the cam 22 permitting the pin 20 to drop into a notch in the disk 16. When the article has been moved from the trip fingers 27 by the conveyor, as hereafter described, the fingers will raise by action of a weighted part of their structure causing the electric circuit to be broken in the mercury tube which will deenergize the magnet 26 and the weight on the bar 24 will move the parts so that the cam 22 will be replaced in the path of the cam roller 20a and upon completing a rotation the clutch will be disengaged. This replacement of the cam 22 occurs before the roller 20a has made a complete revolution with the disk 16, so that the roller will engage the edge of the cam when it reaches that point and the pin 20 will be lifted out of engagement with the disk.

Figure 3:
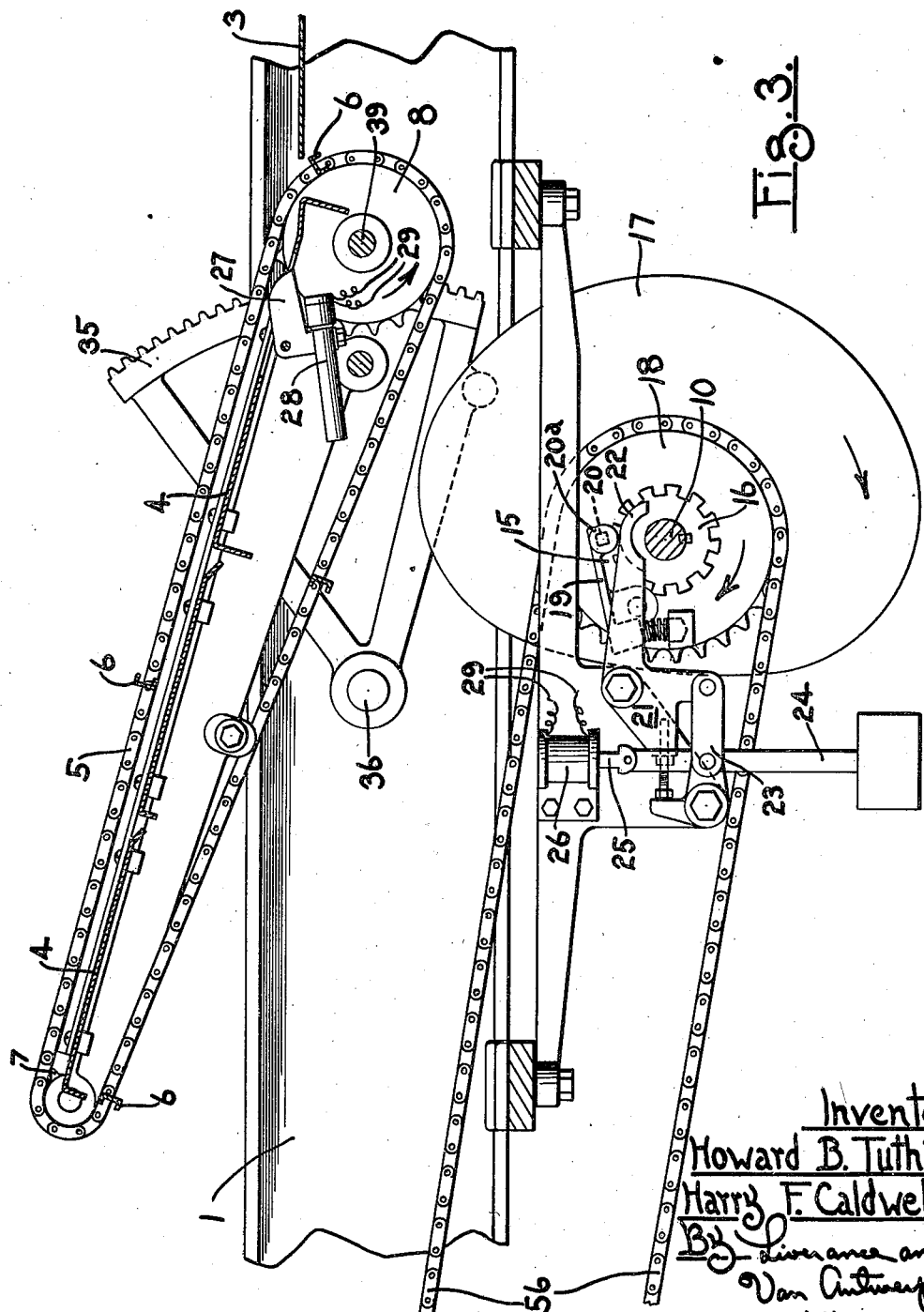
Fig. 3 is a sectional elevation of the driving clutch and infeed conveyor and associated parts.

The cam 17, which is mounted loosely upon the shaft 10, is provided with a cam groove in one of its faces (Figs. 3, 12 and 13). A gear segment 35 is pivoted to the frame at 36 and is provided with a cam roller 37 which extends into the groove of the cam 17 and when the cam rotates it imparts an oscillating movement to the segment 35. The segment 35 meshes with a pinion 38 loosely mounted on a shaft 39 extending transversely across the machine and two spaced apart sprockets 8 are fixed to the shaft 39. The pinion 38 is mounted on one end of shaft 39 adjacent one of the sprockets 8 and a pawl 40 mounted in the hub of the sprocket 8 is adapted to enter a notch in the body of the pinion 38 to impart one way rotation to the shaft 39 through the sprocket 8.

The chains 5 pass around the sprockets 8 and are driven thereby and also around the sprockets 7 at the upper end of the conveyor table 4 and the conveyor bars 6 extend between the chains and sweep along the upper surface of the table 4 as the chains are moved to convey articles that have been placed on the table before them and into the wrapping mechanism. As the cam 17 is rotated it will first move the segment 35 downwardly and the pawl 40 will engage the notch in the pinion 38 and rotate the sprockets 8 and drive the chains 5 in a counterclockwise direction. On upward movement of the segment 35 the pawl 40 will release from the pinion 38 which will rotate freely on the shaft 39.

An elevator indicated generally as 45 (Figs. 4, 5 and 7) having a table 46 is mounted to have a vertical reciprocating movement from a lower point, where the table 46 is in alinement with and adjacent the inner end of the conveyor table 4, to an elevated position. The elevator 45 is provided at its respective edges with blocks 47 which traverse tracks 48 mounted on the respective side members on the frame of the machine which guide the elevator in its reciprocating movements. A casting 49 projects downwardly from the elevator and is connected at 50 to the swinging end of a frame 51 which is pivotally mounted at its other end to the respective side members of the frame of the machine at 52 near the rear end thereof. Between its ends the frame 51 carries a cam roller 53 which rides upon the peripheral face of a cam 54 fixed to a shaft 55. When the cam 54 is rotated it acts, by the above described mechanism, to both vertically reciprocate the elevator and to change the plane of the table 46 during reciprocation so that in its lower position it is in an inclined plane in alinement with the conveyor table 4 and in its upper position it is in a horizontal plane.

The shaft 55 is driven from the shaft 10 by a chain 56 passing around the sprocket 18 heretofore described when the sprocket 18 together with the cam 17 are rotated by engagement of the clutch also heretofore described. The chain 56 passes over a sprocket fixed to the shaft 55. The sprockets on the respective shafts 10 and 55 over which the chain 56 passes are of the same size thereby causing equal rotation of said shafts. A single rotation of each shaft occurring during each cycle of operation of the machine.

Figure 4:
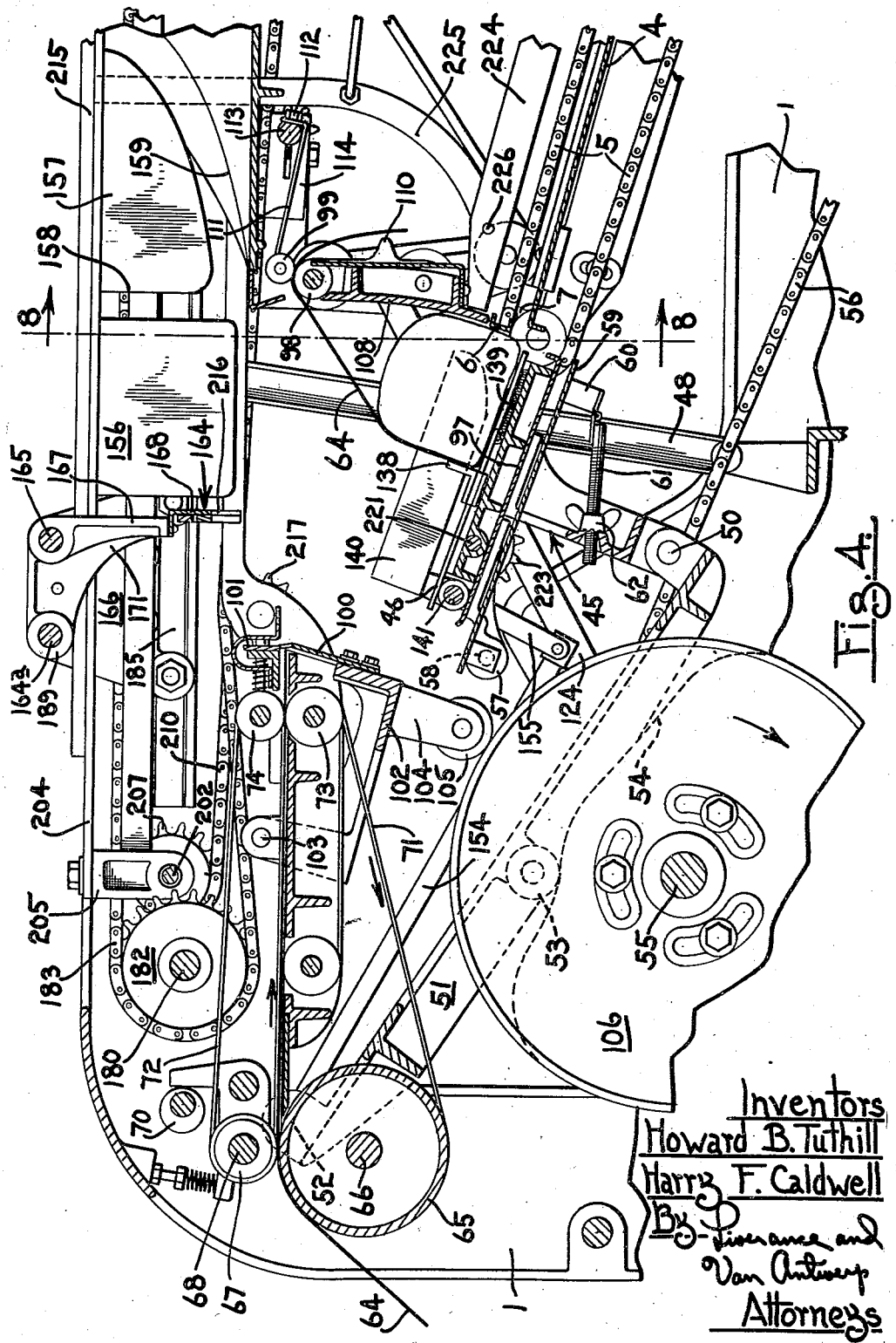
Fig. 4 is a sectional elevation of that part of the mechanism in which the wrapping of the article occurs including the elevator and paper feeding and folding mechanism showing the elevator in lowered position.

It will therefore be apparent that at the time of engagement of the clutch in the position shown in Fig. 3, the cams being rotated in a clockwise direction, the segment 35 will begin its downward movement causing a counter clockwise rotation of the shaft 39 and the pinion 38, which will cause a conveyor bar 6 to move a package onto the plate 46 of the elevator 45 which will be in its lower position at this time as shown in Fig. 4. Immediately after the package has been moved on to the elevator the segment 35 will begin its downward movement and the roller 53 will have moved to its position on the cam 54, shown in Fig. 4, and thereafter will cause the elevator 45 to move upwardly.

The elevator 45 has a portion of its casting 57 extending outwardly therefrom to which is pivotally secured at 58 a lower plate 59. One purpose of this plate will be hereafter more fully described, but for the present it will be sufficient to note that fragments of paper, or crumbs, if bread is being wrapped, may be deposited on this plate and in order to facilitate cleaning the plate it has this pivotal mounting as previously explained. At the opposite end of the plate a portion 60 extends downwardly and has pivotally secured thereto a rod or bar 61 extending through an opening in the member 49. This rod is threaded at its lower end and has a wing nut 62 thereon which abuts against a boss 62a around the opening. When the nut is against the boss, the plate 59 will be maintained in its upper position, and when it is desired to lower the plate, the nut may be loosened an amount sufficient to allow the rod 61 to move in the opening, thus permitting the plate 59 to drop down.

Figure 5:
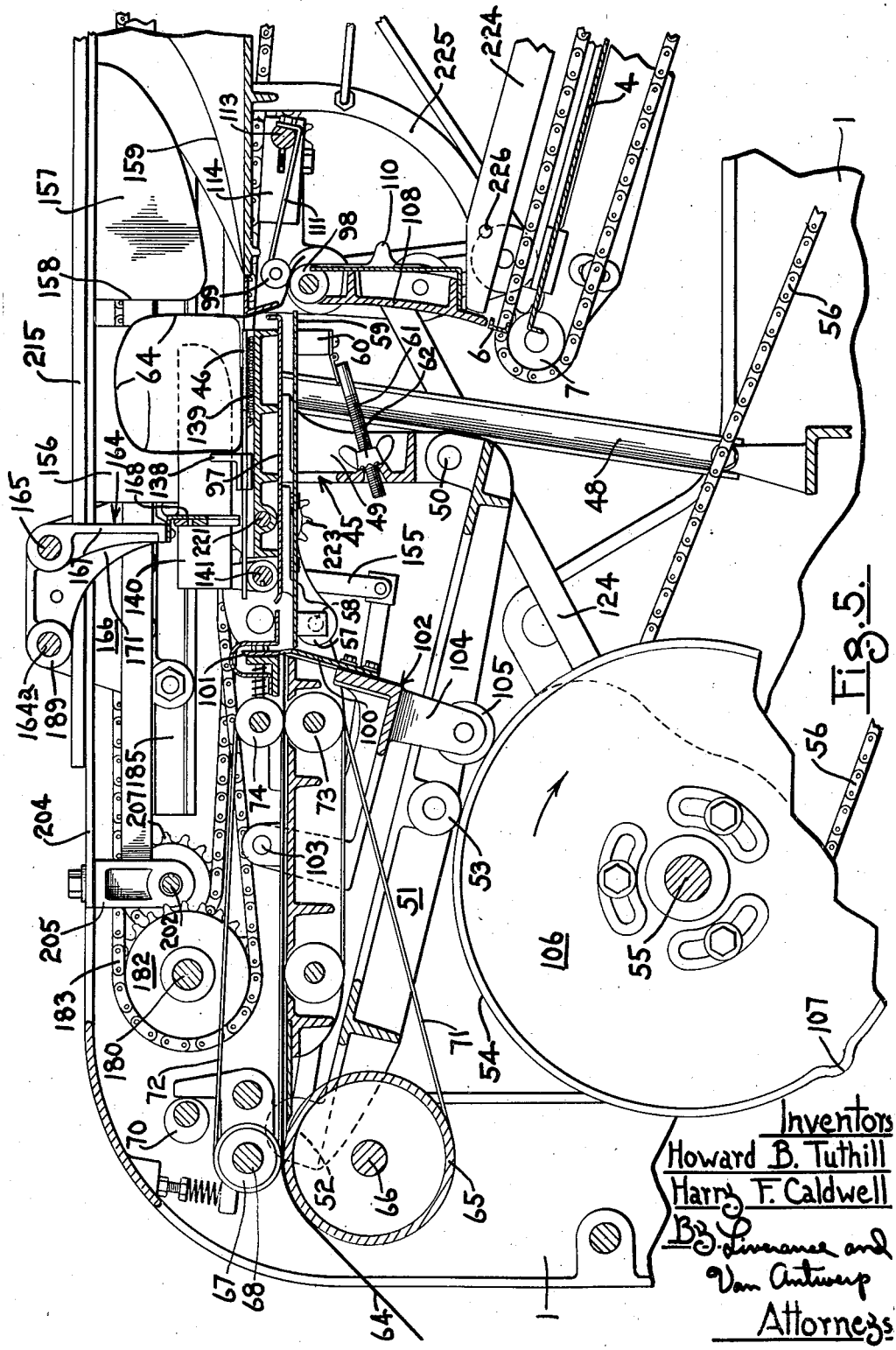
Fig. 5 illustrates the parts of Fig. 4 showing the elevator in raised position.

At the opposite end of the machine a roll 63 of paper 64 is provided and the manner in which this paper 64 is fed into the machine and assumes a position ready to wrap the package will now be explained. Referring now more particularly to Figs. 4 and 5, a drum 65 is provided which is mounted on a shaft 66 and around which the paper 64 passes. Immediately above the drum 65 is mounted a plurality of rollers 67 which are mounted on a shaft 68 for purposes of contacting the upper surface of the paper 64 as it passes over the drum 65. A manually operable lever 69 (Fig. 1) operates eccentrics 70 in such a manner that the rollers 67 may be placed either in a raised position as in Fig. 4 or a lowered position as in Fig. 5, in which position they will contact the upper surface of the paper 64.

By a mechanism which will be presently explained, the drum 65 and rollers 67 are caused to rotate so as to feed the paper intermittently. For purposes of guiding and feeding the paper a plurality of belts 71 pass around the drum (Figs. 4, 5 and 7). And around certain of the rollers 67 belts 72 are passed. The belts 71 at their opposite ends pass over an elongated roller 73, and the opposite ends of the belts 72 pass over the roller 74 so that, as the paper moves forwardly it will be placed between the upper run of the belts 71 and the lower run of the belts 72. In the center of the shaft 68 are also provided rollers 67 with belts 75 passing therearound, the lower run of which will also be in contact with the paper. It will be evident therefore that when the various belts around the drum 65 and the rollers 67 move in a direction indicated by the arrows in Fig. 4, the paper which has been passed over the drums will also be moved in that direction. Since the paper is to be used in comparatively short strips and therefore cannot be fed continuously, it is necessary that the paper be fed only at intervals. The mechanism by which this paper is intermittently fed will now be described.

This part of the description refers more specifically to Figs. 4, 6, 7 and 10. At a point 80 on the frame is pivotally secured the end of an arm 81 which is integral with a gear segment 82. At one end of the drum 65 (Fig. 7) is secured thereto a gear 83a which is enmeshed with a smaller gear 84 on the end of the shaft 68. The gear 83 is enmeshed with the gear segment 82, and there is an overrunning clutch mechanism, which allows the drum 65 to be rotated only on a downward movement of the segment 82.

Since the drum 65 is mounted loosely on the shaft 66, a disengagement of the clutch will allow the segment 82 to move upwardly without rotating the drum and hence without a forward movement of the various belts and consequent movement of the paper. At the end of the shaft 55 is secured a crank 85 which has pivotally mounted thereon at 86 one end of a link 87. The other end of the link is pivotally secured at 88 to a bracket 89, which is in turn secured to the shaft 90 in the frame of the machine. At a point 91 on the arm 81 is pivotally mounted one end of a link 92, the other end of which is secured at 93 to an interiorly threaded block 94. Through the block 93 is passed a threaded rod 95 in an opening of the bracket 89. The outer end of the rod 95 is secured to a crank 96, the turning of which will move the block 94 throughout the length of the opening in the bracket. This portion of the mechanism is merely a means to regulate the length of the stroke of the segment 82 and a consequent control of the amount of paper to be moved over the drum 65 during each operation. From the foregoing it will be seen that a rotation of the shaft 10, when the clutch 15 is in engagement, will rotate the shaft 55 by means of the sprocket chain 56, which will in turn cause the crank 85 to rotate in a clockwise direction. The rotation of the crank 85 will cause an upward movement of the link 87, the bracket 89, the link 92, and lastly the segment 82. Upon a completion of one revolution of the crank 85 the segment 82 will have returned to its position as shown in Fig. 10, and when the previously described clutch 15 is disengaged, further movement of the segment 82 will be prevented. It is clear that the same length of paper will not be used for all sizes of packages and for this reason it becomes necessary to provide some means to regulate the length of a strip of paper which is fed into the machine. The mechanism which provides this purpose has been explained above and it will be obvious that upon turning the crank 96 to force the block 94 to an upper position, it will act to shorten the stroke of the gear segment 82.

When the paper is fed through the machine between the belts 71 and 72 and the rollers 73 and 74 the elevator 45 must be in its upper position so that the paper will be fed between the lower plate 59 and an upper plate 97. The paper continues through the tunnel provided by these upper and lower plates and passes between the rollers 98 and 99. When the desired length of paper has been fed through the machine a knife 100 is actuated to move upwardly past a second blade 101 to cut the paper at this point. The cutting blade 100 is mounted on a casting generally indicated as 102 which is pivotally mounted on the frame at 103. Extending from the bottom of this casting is an arm 104 which has pivotally mounted thereon a roller 105 which is in contact with the edge of a cam 106, which cam is also mounted on the shaft 55 adjacent the cam 54. The cam 106 may be circular with the exception of a small portion thereof which extends outwardly as at 107. The cam is so mounted on the shaft that at the proper time this extension 107 contacts the roller 105 and raises the knife blade 100 to cut the paper at the proper point. After the paper has been cut the segment 82 will be raised in preparation for moving another length of paper in position for being cut.

At the time the paper is cut it will have been moved through the tunnel provided between the plates 59 and 97 and between the rollers 98 and 99. In order that the paper can be moved between these rollers it is necessary that they be separated for a brief interval. To effect this separation a flipper 108 is provided which is mounted on a shaft 109 (Fig. 9) which allows the flipper to rotate about the shaft as an axis. The manner in which the flipper is actuated will be hereafter more fully described, but for the present only that portion which effects a separation of the rollers 98 and 99 will be explained. At the rear of the flipper member an element 110 extends therefrom. Between the rollers 99 (Fig. 9) is secured a bar 111 (Figs. 4 and 5) which is hooked around the shaft on which the rollers 99 are mounted and extends rearwardly and upwardly as at 112 and is mounted so that it will pivot about an axis 113. To this axis and the rod is secured a weight 114 which, under ordinary conditions, tends to keep the rollers 99 in contact with the rollers 98. When the flipper 108 is caused to move upwardly, rotating about the shaft 109, the extension 110 bears against the lower surface of the weight 114 and forces the weight, the bar 111, and rollers 99 upwardly thereby effecting a separation between the rollers 98 and the rollers 99 to allow the paper to be passed therebetween. In its lower position, as will be seen in Fig. 4, the flipper 106 acts as an aid in forcing the package to be wrapped on to the elevator by coming down behind said package.

The mechanism which actuates the flipper is more clearly shown in Figs. 9 and 11. On the shaft 55 is mounted another cam 115. A bell crank having arms 116 and 117 is pivotally mounted at 118 to the frame of the machine. The outer end of the arm 116 has a roller 119 thereon which is maintained in contact with the edge of the cam 115. This contact is maintained by pivotally mounting to the outer arm 117 a rod 120, which passes through a channel member 121 of the machine and terminates in a threaded portion provided with a nut 122. Between this nut and the rear of the channel member a compression spring 123 surrounds the rod. The compression of this spring acts on the bell crank to maintain the roller 119 in contact with the edge of the cam 115 at all times. An elongated bar 124 is pivotally mounted at one end to the outer end of the arm 116 and has its other end secured to one end of the flipper 108 so that as the cam 115 rotates in a counterclockwise direction from its position in Fig. 11 the flipper will begin its upward movement. The cam 115 is provided along a portion of its edge with a portion which is raised still more than the ordinary concentric portion, as shown at 125. During the time the roller is in contact with this portion of the cam the extension 110 will have lifted the rollers 99 to separate them from the rollers 98.

For a purpose which will be more fully described hereinafter it is necessary that there be a slight rotation of the rollers 98 for a short period of time during the wrapping operation and to effect this rotation a continuously moving belt 126 is provided which passes around a driven pulley 127 and two smaller pulleys 128 and 129. The pulley 127 is mounted upon the shaft 127a which is continuously driven by a direct connection with shaft 10. At the outer end of the flipper a short shaft 130 is provided which passes through bearings 131 and 132. To this shaft at one end is secured a sprocket wheel 133 which is a sprocket chain 134 extending therearound and connected to another sprocket wheel 135 which is mounted on the shaft to which the rollers 98 are secured. It will therefore be seen that the rotation of the shaft 130, by means of the sprocket chain 134, will cause a rotation of the rollers 98. At the outer end of the shaft 130 is mounted a pulley 136 which will engage the portion of the belt 126 between the pulleys 128 and 129 when the flipper is in its lowermost position as shown in Fig. 11. The pulley 136 will be in contact with the belt 126 only during the time when the roller 119 is in contact with the smallest concentric portion of the cam 115 as indicated at 137. Since the belt 126 is moving continuously, as soon as the pulley 136 comes into contact with it, it will begin to rotate, causing a rotation of the shaft 130, the sprocket wheel 133, the chain 134, the sprocket wheel 135 and consequently the rollers 98. It will therefore be seen that the flipper 108 acts to separate the rollers 98 and 99 to allow the paper to be fed therebetween, it aids in pushing the package to be wrapped on to the elevator 45 and it also causes a rotation of the rollers 98 for as short a period of time as is necessary.

The table 46 on the elevator 45 is provided with a member 138 which is slidable along the table and has a spring 139 connected thereto which tends to force the element 138 toward the receiving end of the elevator. Thus when a package is moved on to the elevator one edge thereof will be constantly in contact with the element 138 to insure a sufficiently tight wrapping of the package.

From the position of the elevator as shown in Fig. 5 and after a package has been removed therefrom and the paper has been passed through the tunnel and has been cut, the elevator then begins its downward movement. At this point the rollers 98 and 99 are in contact with the paper and will prevent its movement in either direction. When the elevator starts its downward movement, the paper in the tunnel will be allowed to slide therethrough so that when the elevator reaches its lower position as shown in Fig. 4, the paper will have a short portion remaining in the tunnel at the receiving end of the elevator and will extend upwardly toward and will pass between the rollers 98 and 99 so that when a package is pushed from the conveyor 4 by the conveyor bars 6 on to the plate 46 of the elevator, the forward edge thereof will come in contact with the paper which will become taut as it reaches the position shown in Fig. 4. The member 138 will also be moved rearwardly by this action and aids in keeping the paper from becoming loose about the package. At this point the paper then completely covers one side of the package and a portion of the bottom thereof. As the elevator then begins its upward movement it is necessary that the paper be maintained in a taut condition inasmuch as the package nears the rollers between which the paper passes. It is at this point that the pulley 136 contacts the belt 126 and causes a rotation of the rollers 98 which will move the paper a short distance as the elevator rises to prevent wrinkling thereof and a consequent loose wrapping. After the package has moved past and above these rollers, rotation is stopped and allows the paper to be pulled out from between the rollers 98 and 99.

Up to this point it has been seen in what manner the paper is placed around the package, and the means by which the ends are folded in will now be explained. The elevator is provided on its upper side with tuckers 140 which extend longitudinally on either side of the table 46 so that when a package is moved on to the elevator it will be moved between these tuckers which have previously been adjusted so that the distance between them is equal to the length of the package to be wrapped. It will be evident, therefore, that since the paper is initially in front of these tuckers, the movement of the package on to the elevator and between the tuckers will cause the ends of the paper to fold inwardly about either end of the package.

Initially the tuckers 140 diverge outwardly toward the ends which receive the package so that when the package begins to enter the area between the ends of the tuckers they are spread apart, but immediately after the package has been pushed fully between the tuckers the ends are then closed so that the two tuckers will be in parallel relationship. This movement is for the purpose of obviating any difficulty which might arise in getting the package initially between the tuckers. The mechanism by which this motion is accomplished will now be explained with general reference to Figs. 4, 5 and 11, and with particular reference to Figs. 14 and 15.

At the rear of the tuckers 140 and below them in the elevator 45 is a shaft 141 which extends laterally across the elevator. Immediately below the tuckers and just outside of the plane of each one is a bearing 142 through which the shaft passes and which has an opening in the top thereof for the purpose of receiving a rod 143. This rod extends vertically upwardly from the bearing 142 adjacent the end of each tucker 140. Extending outwardly from the bottom of each tucker is an arm 144 which has an opening therethrough at its inner end through which the rod 143 passes. The upper end of the rod 143 extends through an opening in an arm 145 which extends outwardly from the upper portion of each tucker. This construction is for the purpose of allowing the tuckers to be removed and replaced easily and quickly without the aid of a wrench or other tool, gravity alone keeping them in positoin. A bifurcated member 146 is keyed to the splined shaft 141 and extends upwardly therefrom at the outer end of the arm 144, where the bifurcated portion is adapted to receive a ball portion 147 which extends from the outer end of the arm 144. The shaft 141 is adapted to be rocked and when this is done the tuckers will diverge outwardly as above explained. To be more explicit, it will be noted that in Fig. 15 when the shaft 141 rocks in a clockwise direction the fixed ends of the tuckers will rotate about the rods 143 as an axis which will cause the outer free ends of the tuckers to move away from each other; and when the shaft 141 is rocked back to its normal position as shown in Fig. 15, the outer free ends of the tuckers will be moved inwardly so that the tuckers will be parallel.

The mechanism which is operated to rock the shaft 141 is clearly shown in Fig. 11. To a portion of the frame of the machine is pivotally mounted an arm 148 of a Y-shaped member. Another arm 149 of this member extends downwardly and has a roller 150 at the end thereof. This roller is kept in contact with the edge of a cam 151 which is secured to the shaft 55 and rotates therewith. The cam 151 has a greater part of its edge concentric with the shaft 55, while a portion 152 is also concentric with its center of rotation but is of a less diameter. It is during the time that the roller 150 is in contact with the portion 152 of less diameter that the outer free ends of the tuckers 140 will be diverged. The outer end of the third arm 153 of the Y-shaped member is pivotally secured to an arm 154, which has pivotally secured to its other end a short arm 155 extending upwardly which has its upper end secured to the shaft 141. A small block 156 which is secured to the frame of the machine has extending therefrom a compression spring 157. This spring is in contact with said Y-shaped member and acts to maintain the roller 150 in constant contact with the cam 151 so that when the smaller portion 152 of the cam reaches the roller 150 the Y-shaped member will move slightly in a counterclockwise direction about the end of the arm 148 which is pivoted to the frame. When this occurs, the arm 154 will be moved toward the left as viewed in Fig. 11 thus causing a clockwise rotation of the shaft 141.

After the package has been moved on to the elevator and has been partially wrapped as shown in Fig. 4, the elevator then starts its upward movement and the paper across the top of the package will pass between stationary end members 156 which act to fold the upper end portions of the paper downwardly. After this portion has been completed the package is then pushed forwardly from its position in Fig. 5. At this point, members 157 are positioned at either side of the upper portion of the machine and their front edges 158 will fold the ends of that side of the package inwardly as the package passes therebetween. At this point the package will appear as in Fig. 16. The members 157 have upwardly curved portions 159 thereon for the purpose of folding upwardly the remaining portion of the wrapper as the package is passed between the members 157.

It will therefore be seen by viewing Fig. 16 that as the package is first moved on to the elevator the paper covers the forward side of the package and the portion 160 of the ends will have been folded inwardly. As the package moves upwardly on the elevator the paper is wrapped around the top and other side and when it reaches the member 156 the portion 161 of the ends will be folded downwardly. Then, as the package is moved off of the elevator and contacts the edges 158 of the members 157, the portions 162 of the ends are folded inwardly. As the package is moved still further and contacts the upwardly curved edges 159, the remaining portion 163 will be folded upwardly to complete the wrapping of the package.

The pusher member which acts to move the package off of the elevator on to the final conveyor for wrapping the package is generally indicated as 164. The various parts which constitute this pusher and the mechanism by which it is operated will now be described.

In describing the pusher particular reference will be made to Figs. 2, 4, 5, 8 and 11. The pusher itself includes two laterally extending elongated rods 164a and 165 positioned in the same horizontal plane. At each end of these rods a plate 166 (Fig. 10) is secured and extends downwardly therefrom. In the center of the rod 165 is a member 167 which has secured thereto and extending downwardly therefrom a plate 168, which plate contacts one edge of the package when it is being pushed off of the elevator. On either side of the member 167 on the shaft 165 is positioned bearing members 169 and 170 which have depending downwardly therefrom portions 171 and 172, as indicated in Fig. 8. These last named portions have a configuration as shown in Fig. 8 to allow to allow a lateral adjustment thereof, that is, the portion 171 has an extension 173 thereon and the portion 172 has an extension 174 thereon. The portions 173 and 174 extend inwardly toward each other and in the same vertical plane so that if it becomes necessary to move the members closer together than they are shown in Fig. 8 recesses are provided in each portion to receive the extensions 173 and 174. These portions are positioned toward the left of the pusher plate 164 as viewed in Figs. 4 and 5.

Referring now specifically to Fig. 11, at the outer end of the shaft 90 is secured one end of an arm 175. This arm is adapted to rock with the shaft 90 and may be either keyed thereto or pinched thereon as shown in the drawing. To the other end of the arm 175 is pivotally secured one end of an arm 176 which extends upwardly and is positioned in an arcuate slot 177 which is concentric with the opposite end of the arm. The slot 177 is in a casting which is integral with and extends outwardly from a cast gear segment 178 which is pivotally mounted at 179 to the outside of the frame of the machine. Near the end of the machine and extending laterally thereacross is a shaft 180 which has a pinion 181 at the outer end thereof and adapted to be enmeshed with the gear segment 178. Immediately inside of the frame on either side of the machine are positioned sprocket wheels 182 around which are passed sprocket chains 183 each of which extends around a similar sprocket 182a (Fig. 10) near the opposite end of the machine. To the upper run of each sprocket chain 183, as seen in Fig. 8, is secured an angle member 184. To the other portion of each of these angle members is secured the end plates 166 of the pusher. It will therefore be seen that as the shaft 90 rocks in a counterclockwise direction the arms 175 and 176 will be lowered, which in turn will lower the gear segment 178 and cause a clockwise rotation of the sprocket wheels 182 as viewed in Figs. 4 and 5. This will then cause the sprocket chains 183 to move in the direction indicated by the arrow in Fig. 4 and consequently a movement in the same direction of the pusher device since it is secured to the upper run of said chain.

Another purpose of the end plates 166 is to maintain the pusher member in a vertical position. At each side of the machine is positioned a track member 185 (Figs. 8 and 10) which extends longitudinally of the machine, and at the bottom of each plate 166 and secured thereto are rollers 186 and 187 which are positioned within the track 185. These rollers, being adapted to run in the track 185 as the pusher is moved forwardly and rearwardly acts as a supporting means to maintain movement of the pusher in a horizontal plane. Also secured to the rod 164a in horizontal alinement with the bearing members 169 and 170 on the rod 165 are bearing members 188 and 189 (Fig. 2) which are secured to the bearings 169 and 170 respectively to aid in maintaining the pusher plate in a vertical position.

For the reasons which will be more clearly explained hereinafter, it may be desirous to vary the distance which the pusher moves in a forward direction, although it is necessary that it always return to the same position initially regardless of how long a distance it may travel. In order to adjust the pusher in this manner the slot 177 is provided. It will be noted that since this slot is concentric with the axis about which the opposite end of the arm 176 rotates, any movement of the upper end of this arm in the slot 177 will insure the returning of the pusher to its original position as shown in Fig. 11 regardless of how great a distance it may have moved in a forward direction. This is true because the upper end of the arm 176 may be placed nearer to or farther from the point 179 about which the gear segment 178 rotates. Viewing the mechanism as in Fig. 11 the upper end of the arm 176 may be moved to the left-hand end of the slot. The distance through which the end of the arm 176 will move in this position will be the same as when it is located at the outer end of the slot 177; but since the pivot point is at 179, the segment 178 will move a greater distance when the arm 176 is at inner position than when it is at the outer end of the slot farther away from the pivotal point, and therefore it follows that the pusher will be moved a greater distance when the arm 176 is at the inner end of the slot 177 than when it is at the outer end thereof.

Inasmuch as the type of wrapping paper to be used is adapted to be sealed by the application of heat thereto it is necessary that after the package has been completely wrapped the ends and bottom thereof be sealed by the application of heat thereto. To provide for this operation a bottom heating plate is provided and heating elements 190 and 191 are positioned at either side of the track over which the package passes after it has been wrapped (Fig. 2). It is to be noted that these heating elements are also adjustable toward or away from each other in order that they may be adapted for use with packages of varying lengths. Depending upon the type of paper used to wrap the packages, the time required to seal the paper by applying heat thereto or the amount of heat used will vary. That is, if Cellophane is used, it is necessary to apply a greater amount of heat in order to seal the ends of the packages than if waxed paper were to be used. In some instances the time required may be sufficiently short so that the package may be pushed directly all the way through the area between the heating elements to effect the seal, and in certain other instances it may be necessary to allow the package to remain in contact with the heating elements a longer period of time or apply a greater amount of heat. For this reason it is necessary to vary the length of travel of the pushing element as explained above. If a type of paper is being used which can be sealed by a comparatively short period of heat application, the pusher may be adjusted to run its full length in order to push the package through the area between the heaters; this is assuming that the length of time required to effect a seal of the paper is the same as the length of time required for the pushers to push a package the length of the heating elements. In cases where a longer period of time is required to heat the paper and thereby effect a seal thereof, the length of travel of the pusher is shortened so that upon its forward movement it will travel only far enough to place a package perhaps just within the receiving ends of the heaters. When this is done, the package will remain in that position during the time the pusher returns to its initial position and pushes another package between the heaters at which time the second package will replace the first, while the first package will move forwardly and approach the ends of the heating elements where it will leave upon the entering of the third package. If the length of time required to effect a seal is between these two extremes, the first package may be moved to the far ends of the heaters. It is to be remembered, however, that regardless of how far the pusher moves forwardly it always returns to the same initial position.

It may be here noted that when the package is raised upwardly on the elevator, it rises with considerable force and to prevent the package from being thrown into the air, the arms 192 and 193 are provided, which are secured to either side of certain framework in the machine (which will be explained hereafter), and are positioned above the elevator in its raised position to prevent the package from being thrown upwardly. These arms are shown more clearly in Figs. 2 and 8.

As the packages leave the area between the heating elements they are forced on to a track 194. At each side of the track are belts spaced apart from each other a distance equal to the length of the package so that they will contact the ends of said packages and carry them forwardly down the track as the belts move simultaneously in that direction. These belts at each side of the track pass around pulleys 195 and 196 positioned in a horizontal plane on vertical shafts which will rotate in a clockwise direction, as viewed in Fig. 2, so that the inner run of each belt will move toward the right thus carrying the packages forward.

At the outer ends of the track 194 are positioned rollers 197 so that when the packages reach this point they will be automatically ejected therefrom. Just after the packages leave the conveyor belts, but before they reach the rollers 197, they are contacted at either end by cooling coils 198 and 199 also positioned at either side of the machine a distance apart from each other equal to the length of the package being wrapped. These coils may not be necessary in all cases but they are provided so that the ends of the packages may be cooled before they are removed from the machine after they leave the heating elements.

It is obviously necessary to provide some means of adjustment whereby various parts of the machine may be adjusted to receive different lengths of packages. We have provided means in our device whereby each portion of the machine to be adjusted can be done easily and quickly by merely turning a single crank which is so connected to all of the various parts that they will all be adjusted simultaneously.

Due to the varying lengths of packages which may be wrapped in the machine it will be seen that the side guide members positioned above the plate 4 from whence the package enters the wrapping machine will have to be adjusted to the length of the package passing therebetween. After the package has moved onto the elevator, the tuckers 140 will close and it is necessary that these also be regulated so that the distance between them will be equal to the length of the package. As the package moves upwardly and the ends are folded downwardly it passes between the members 156, 157, 158 and 159, which also must be adjusted to receive the package. Then after the package moves forwardly between the heaters, the conveyor belts, and the cooling coils, each of these in turn must also be a distance apart equal to the length of the package. To facilitate the adjustment of each of these members simultaneously so that they will all be adjusted the same distance apart, we have provided near the forward end of the machine a shaft 200 (Fig. 2) which is oppositely screw threaded at either end thereof so that upon turning the crank 201 at the outer end thereof any elements which may be connected to said shaft will be correspondingly moved toward or away from each other depending upon the direction in which the shaft is rotating. At the opposite end of the machine a similar shaft 202 is provided which is similarly screw threaded in opposite directions at either end. Extending between the two shafts 200 and 202 are elongated strips of sheet metal 203 and 204. At one end, these strips of metal are secured and threaded to the threaded portions of the shaft 202 by means of a bracket 205 which extends downwardly from the ends of said strips (Figs. 4 and 5). In a similar manner the opposite ends of the strips 203 and 204 are in threaded engagement with the threaded portions of the shaft 200 by means of the brackets 205a. At one side of the machine on the shaft 200 is provided a sprocket wheel 206, and at the same side of the machine secured to the outer end of the shaft 202 is a sprocket wheel 207. On the same side of the machine secured to the frame thereof is a short shaft 208 which has secured thereto a sprocket wheel 209. A sprocket chain 210 passes around each of the sprocket wheels 206, 207 and 209 so that when the crank 201 on the shaft 200 is rotated, the shaft 200 and the shaft 202 will also be rotated to move the chain 210 by means of the various sprocket wheels mentioned. The shaft 208 is positioned in the side of the machine and is adapted to be placed in any of a plurality of positions by means of the various openings shown at 211. This adjustment is merely for the purpose of regulating the tension upon the chain 210. At this point, then, it is evident that upon turning the crank 201 the strips 203 and 204 will be maintained in parallel relationship and will be moved either toward or away from each other depending upon the direction of rotation of said crank.

It will also be evident that anything which is mounted upon these strips will move with them in a corresponding manner, and for this reason several of the elements which must be adjusted so that the distance therebetween will be equal to the length of a package to be wrapped have been mounted on these strips 203 and 204 and adapted to move therewith as will presently be described. In Fig. 2 where the arms 192 and 193 are shown, the outer ends of which prevent the package from being thrown upwardly, are mounted by means of links 212 to the strips 203 and 204 near one end thereof. The members 156 which are positioned on each side for the purpose of folding the paper downwardly around the ends of the package are also secured to the strips 203 and 204 by means of bolts as shown in Fig. 2. Likewise the members 157 which fold the ends inwardly as the package is being pushed off of the elevator and the members 159 which fold the portion 163 upwardly are secured at each side to the strips 203 and 204. In a similar manner the heating elements 190 and 191, the pulleys 195 and 196 and the cooling coils 198 and 199 are all secured to the strips 203 and 204. When these strips are moved toward or away from each other by rotation of the crank 201 all of these above mentioned elements will move with said strips and thereby be adjusted to properly receive a package.

The bearings 169 and 170 on the pusher member each has extending outwardly therefrom a small shaft 213, at the outer end of which is secured either a fiber block or roller 214. Immediately below each of the rollers 214 a channel member 215 is secured at one side of and above each of the strips 203 and 204. This construction is clearly shown in Figs. 2 and 8. The rollers 214 are adapted to ride between the upturned portions of the channel member 215 and since the bearings 169 and 170 are mounted loosely on the shaft 165, a movement of the strips 203 and 204 toward or away from each other will, by means of the channel 215 and rollers 214, effect a movement toward or away from each other of the bearings 169 and 170 and consequently the portions 171 and 172 of the pusher member. This adjustment is obviously necessary for the purpose of adequately taking care of pushing larger or smaller packages.

It should be noted at this point that the plate 168, as viewed in Fig. 8 has in the center thereof a cutout portion 216. This opening is provided in view of the fact that the member 138 on the elevator table in its upper position will be in direct alinement with the bottom of said plate, and when the pusher is moved forwardly, this opening allows the plate to pass over said member 138 in order to contact a side of the package.

It has been noted above that two main sets of sprocket chains have been provided, namely, the sprocket chains 183 to which the pusher member is secured and the sprocket chain 210 which is moved by rotation of the shafts 200 and 202 for the purpose of adjusting the various parts previously mentioned. In order to prevent the bottom run of each of these chains from sagging downwardly too far, small sprocket wheels are provided at stationary points beneath the lower runs of each of these chains. In Fig. 10 it will be noted that a sprocket wheel 217 is secured to a short shaft 218 mounted on the casting which carries the paper in a horizontal direction. This sprocket wheel is in engagement with the lower run of the chain 183 which actuates the pusher mechanism. This pusher chain support may also be viewed in Fig. 10. Also in this figure will be seen the sprocket wheel 219 mounted on the shaft 113 which is in engagement with the lower run of the adjusting chain 210.

There must also be some way in which to laterally adjust the tuckers 140 and for this purpose a shaft 221, which is threaded in opposite directions at each end thereof, extends laterally of the elevator table. Referring now more particularly to Figs. 7, 14 and 15 it will be seen that an arm 222 is provided at either side of each of the elements 146. One end of each arm 222 passes around and is loosely mounted on the shaft 141, while the other end of each arm is threaded to the respective ends of the shaft 221. Therefore, when the shaft 221 is rotated, the arms 222 will cause a movement of the elements 146, and consequently the tuckers 140, either toward or away from each other depending upon the direction of rotation of said shaft 221. In order that the adjustment between these tuckers may be made simultaneously with and throughout the same distance as all of the other adjustable members previously mentioned, a sprocket wheel 223 is secured to one end of the shaft 221. When the elevator is in its raised position as in Fig. 5, the sprocket wheel 223 will be in engagement with the lower run of the adjusting chain 210.

It will therefore be seen that when the crank 201 is rotated to cause a movement of the chain 210 and a consequent adjustment of the various parts, by the engagement of the sprocket wheel 223 with the lower run of the chain 210 a rotation of the shaft 221 will be effected and consequently a corresponding adjustment of the tuckers 140.

Before the package reaches the elevator, it is moved upwardly over a table 4 which has extending along either side thereof guide means 224. It is obvious that these guide means also must have some means of adjustment in order to properly receive packages of various sizes. It will be noted in Figs. 4 and 5 that a curved member 225 on each side is connected at its lower end by means of a rod 226 to one end of the guide members 224. At their upper ends the members 225 will be secured to the strips 203 and 204 and will be moved with said strips when they are actuated for adjusting purposes thereby also effecting a corresponding adjustment of the guide members 224. At the opposite end of the guide members 224 similar members 225a extend upwardly from the ends of the guide members 224 and are in threaded engagement with either end of the adjusting shaft 200. This is obviously so that a rotation of said shaft 200 will cause a movement of the said guides 224 simultaneously at each end thereof. By providing small hand adjusting means 227 adjacent the upper ends of the member 225a, the outer ends of the guide members 224 may be adjusted independently of their opposite ends. Since it is usually desirable to provide a greater distance between the outer ends of the guide members 224 than between the inner ends thereof to allow sufficient room for a package to enter, these individual hand adjustments are provided. Also at the inner ends of the guide means compression springs are provided around the rods 226 and are adjusted by means of lock nuts on the outer ends thereof. By an adjustment of these nuts, the inner ends of the guide members 224 may also be adjusted independently of the rest of the devices if it is so desired.

It will therefore be evident that when an adjustment becomes necessary to take care of a longer or shorter package, the elevator 45 will be raised to its upper position to allow the sprocket wheel 223 to engage with the lower run of the adjusting chain 210. The crank 201 is then rotated and by means of the mechanism which has been above described, the two shafts 200 and 202 will be rotated causing a movement of the strips 203 and 204 together with all of the elements which are connected thereto and at the same time a rotation of the shaft 221 will be effected to cause an adjustment of the tuckers.

After having adjusted the various parts to the proper distance to receive a predetermined length of package, it will then be determined the length of a piece of paper to completely wrap said package. This adjustment is made, as above explained, by rotating the crank 96 (Fig. 10) which will either lengthen or shorter the distance through which the gear segment 82 passes and consequently the length of paper which passes over the drum 65.

After this adjustment has been made it then remains to determine, according to the type of paper used, the length of time required for the wrapped package to remain in contact with the heating elements 190 and 191 in order to effect a sealing of the ends of said package. This having been determined the adjustment of the mechanism shown in Fig. 11 will then be made by shortening or lengthening the distance through which the pusher is to travel by moving the upper end of the arm 176 either toward the inner or the outer end of the slot 177. All of these various adjustments having been made the machine is ready to begin operation by the placing of a package on the table 4.

*Operation*

As the package leaves the conveyor table 4 it trips the fingers 27 which energize the solenoid to engage the clutch 15 and begin movement of the conveyor bars 6. It is understood that throughout the entire operation the shafts 10 and 127a are being continuously driven. At this point the elevator 45 will be in its lowered position tilted at an angle substantially parallel to the table 4. A strip of paper will have previosly been fed through the tunnel on the elevator formed between the plates 59 and 97 and will have been cut by the knife blade 100, so that the elevator in its lowered position will have draped the sheet of paper downwardly so that it hangs down in front of the flipper 108 and has a small portion remaining in said tunnel. The element 139 will be in position at the receiving end of the plate 46.

The conveyor bar 6 will move the package on to the plate 46 and will move the element 138 rearwardly and the contact between said element and the paper, which now covers one side of package and a portion of its bottom end, will prevent same from slipping.

The tuckers 140 which are positioned at either side of the elevator will have their free ends diverged slightly upon the entrance of the package therebetween, but will close as soon as the package is passed fully onto the table 46 and as the package moves rearwardly along said table and between said tuckers they will act to place the first fold 160 about the ends of the package. At this point the package and mechanism will be in the position shown in Fig. 4.

The roller 53 is then actuated by the cam 54 to move the elevator casting 51 upwardly about its pivotal point 52. At the same time the rollers 98 begin a rotation by being actuated by the pulley 136 contacting the belt 126. As the package moves upwardly, therefore, the rotation of the rollers 98 will maintain the upper stretched portion of the paper in a taut condition. Since the elevator 45 is pivotally mounted to the elevator casting at 50 and rides in the track 48, the plate 46, as it moves upwardly approaches a horizontal position. As the top of the package reaches the lower edges of the members 156 the top side of the package will have been covered by the paper and the rollers 98 will have ceased rotating to allow the paper to be pulled outwardly. After the package moves upwardly between the plates 156, which have been adjusted to the length of the package, that portion of the wrapper which extends outwardly beyond the ends of the package will be folded downwardly.

As soon as the package reaches its upper horizontal position the pusher member is actuated to push the package off of the plate 46, at which time the remainder of the paper will be folded around the bottom and the passage of the package between the members 157 will fold the opposite edge portions about the ends. As the package moves still further forwardly the upper curved portions 159 act to fold upwardly the remaining lower portion of the wrapper. This completes the wrapping operation and the package is then pushed forwardly between the heaters 169 and 170 to the desired position therebetween and allowed to remain there long enough to seal the end portions as well as the bottom of the package. As the next package is pushed off of the plate 46, the first package will be moved on to the conveyor table 194 and between the conveyor belts which carry the package forwardy to the cooling units 198 and 199. After the seal on the packages have been sufficiently cooled they are then passed to the rollers 197 at which point they are removed from the machine.

From the foregoing it will be seen that we have constructed certain new and useful improvements in wrapping machines which operate economically and advantageously. While we have preferred to show in the drawings our invention as particularly applicable to wrapping bread, it is to be understood that our machine is equally well adapted to wrap any number or variety of packages or articles.

Other modes of applying the principle of our invention may be employed instead of the one here explained, change being made as regards the mechanism here disclosed, provided, however, the means stated by any of the following claims or the equivalent of such stated means be employed.

We, therefore, particularly point out and distinctly claim, as our invention.

1. In a wrapping machine having infeed and outfeed conveyors, elevator mechanism including an elevator casting pivotally mounted at one end, an elevator carriage pivotally secured at the other end of said casting, an upwardly extending track, and means on said carriage adapted to ride in said track, whereby said carriage will be in substantial alinement with the infeed conveyor in one position and with the outfeed conveyor in another position.

2. A wrapping machine comprising infeed and outfeed conveyors, an elevator to receive the package to be wrapped from the infeed conveyor and deposit it on the outfeed conveyor, a paper tunnel having upper and lower sides in said elevator, means for feeding paper through the tunnel on said elevator, means for cutting said paper in predetermined lengths, means for draping said paper over the receiving end of said elevator after same has been cut, means for folding said paper about said package, and means for ejecting said package onto said outfeed conveyor.

3. In a wrapping machine having an elevator therein, means for feeding paper through said machine, and a tunnel in said elevator having upper and lower sides to receive said paper, the lower side of said tunnel being normally in substantial parallelism with its upper side and adapted to be swung downwardly whereby said paper tunnel may be cleaned.

4. In a wrapping machine having an infeed conveyor, an elevator, tuckers pivotally mounted on said elevator to fold the ends of the wrapping paper about a package, means to diverge said tuckers at the moment the package is introduced therebetween and to close them about the ends of the package as said package moves onto said elevator from said infeed conveyor, and means to adjust the distance between the pivotal points of said tuckers.

5. In a wrapping machine provided with infeed and outfeed conveyors and an elevator to receive an article to be wrapped from said infeed conveyor and aline said article with said outfeed conveyor, a pusher plate for pushing said article from said elevator onto said conveyor comprising two telescoping pieces adapted to be moved toward or away from each other in the same vertical plane whereby said plate will assume the same length as said article.

6. The combination of elements defined in claim 5, combined with means to automatically adjust the position of the telescoping pieces of said plate.

7. In a wrapping machine provided with infeed and outfeed conveyors and means for receiving an article to be wrapped and aline said article with said outfeed conveyor, a pusher plate for pushing said article onto said outfeed conveyor, and means to vary the distance through which said plate moves forwardly from a fixed point.

8. The combination of elements as defined in claim 7, said last named means including a pivotally mounted gear segment having an arcuate slot therein, an arm having one end releasably secured in said slot, the center of curvature of said slot being the other end of said arm, a link connecting said other end to a rock shaft, and a connection between said pusher and said gear segment whereby said pusher will always be returned to its initial position but a variation of the position of said arm in said slot will vary the distance through which said pusher is moved.

9. A wrapping machine comprising infeed and outfeed conveyors, guide means at each side of said infeed conveyor, an elevator for raising an article to be wrapped from the infeed to the outfeed conveyors, tucker arms on said elevator, means for folding wrapping paper about said article, heating elements to seal the ends of the wrapped article, conveyor belts on each side of said outfeed conveyor, means for pushing said article from said elevator through said heating elements onto said outfeed conveyor, and means for simultaneously adjusting said guide means, tucker arms, folding means, heating elements, conveyor belts and pusher means to receive said article.

10. The combination of elements as defined in claim 9, said tucker arms adapted to be adjusted simultaneously with the other of said elements only when said elevator is in a raised position.

11. The combination of elements as defined in claim 9 and independent adjusting means to vary the distance between each end of said guide means on the infeed conveyor.

12. In a wrapping machine having infeed and outfeed conveyors and an elevator to receive an article to be wrapped from said infeed conveyor and aline it with said outfeed conveyor, means for placing wrapping paper partially around said article when the elevator is in a lower position, and means for maintaining said paper taut while the elevator is rising including rollers between which said paper passes, a continuously running belt, and driving means to contact said belt during the rising of said elevator, whereby one of said rollers is rotated to pull the paper away from said elevator.

13. In a wrapping machine having infeed and outfeed conveyors, an elevator, tuckers on said elevator to fold the ends of the wrapping paper about a package, means to diverge said tuckers at the moment the package is introduced therebetween and to close them about the ends of the package as said package moves onto said elevator, and means for removably mounting said tuckers on said elevator including upwardly extending rods, and arms extending horizontally from said tuckers having openings therein to receive said rods.

14. A wrapping machine comprising infeed and outfeed conveyors, an elevator for raising an article to be wrapped from said infeed to the outfeed conveyors, tucker arms on said elevator, guide means on said infeed conveyor, and means for simultaneously adjusting said tucker arms and guide means to receive said article.

15. A wrapping machine comprising infeed and outfeed conveyors, an elevator for raising an article to be wrapped from said infeed to the outfeed conveyors, guide means on the infeed conveyor, tucker arms on said elevator, additional means for folding wrapping paper about the article and means to simultaneously adjust said guide means, tucker arms, and additional folding means to receive said article.

16. A wrapping machine comprising infeed and outfeed conveyors, an elevator to raise an article to be wrapped from the infeed to the outfeed conveyors, tucker arms on said elevator, means for folding wrapping paper about said article, means for pushing said article from said elevator to said outfeed conveyor, and means for simultaneously adjusting said tucker arms, folding means, and pusher means to receive said article.

17. A wrapping machine comprising infeed and outfeed conveyors, an elevator to raise an article to be wrapped from the infeed to the outfeed conveyors, guide means on each side of the infeed conveyor, tucker arms on said elevator, heating elements to seal the ends of the wrapped article, and means to simultaneously adjust said guide means, tucker arms, and heating elements to receive said article.

18. The combination of elements defined in claim 17, said tucker arms adapted to be adjusted simultaneously with the other of said elements only when said elevator is in a raised position.

19. The combination of elements defined in claim 17, and independent adjusting means to vary the distance between each of said guide means on the infeed conveyor.

20. The combination with a wrapping machine having infeed and outfeed conveyors and an elevator to raise the article being wrapped from the infeed to the outfeed conveyors, of means for placing wrapping paper partially around the article when the elevator is in lower position, and means to yieldably draw the unwrapped portion of the paper in a direction away from the article during the upward movement only of the elevator thereby maintaining the paper in a taut condition.

21. A wrapping machine comprising an infeed conveyor, an outfeed conveyor above the infeed conveyor, an elevator to raise the article being wrapped from the infeed to the outfeed conveyor, said elevator being inclined in its lower position, and pivotally mounted means to guide the article as it is raised to the outfeed conveyor.

22. The combination with a wrapping machine having infeed and outfeed conveyors and an elevator to raise the article being wrapped from the infeed to the outfeed conveyor, of means for placing wrapping paper partially around the article when the elevator is in lower position, and pivotally mounted guide means to guide the article while it is being raised.

23. The combination of elements defined in claim 22, combined with means to yieldably draw the unwrapped portion of the paper in a direction away from the article during the upward movement only of the elevator thereby maintaining the paper in a taut condition.

24. The combination of elements defined in claim 22, combined with means to yieldably draw the unwrapped portion of the paper in a direction away from the article during the upward movement only of the elevator thereby maintaining the paper in a taut condition, means to raise and lower said guide means, and means associated with said guide means to actuate the yieldable means only when it is in lowered position.

25. The combination of elements defined in claim 22, combined with means to raise and lower said guide means, a pair of rollers between which the unwrapped portion of the paper is yieldably gripped, and means on said guide means to rotate one of said rollers when the guide means is in lower position to maintain the paper in a taut condition.

26. The combination of elements defined in claim 22, combined with means to raise and lower said guide means, means to yieldably grip the unwrapped portion of the paper, and means on said guide means to open said yieldable means when the guide is in raised position for the reception of paper therein.

27. A wrapping machine comprising, an elevator to receive an article to be wrapped, means to move said elevator in an arcuate path, means for intermittently feeding paper through said machine, means to cut said paper into predetermined lengths, means for draping a length of said paper between said article and said elevator which includes a tunnel in said elevator through which the paper passes and means to grasp said paper near one end thereof while said elevator is being lowered whereby said paper will be draped between said gripping means and one end of said tunnel, means for partially wrapping said article when said elevator is in a lowered position, and means for completing the wrapping operation when said elevator is in an upper position.

28. In a wrapping machine, the combination with a lifter table moving from a lower level at which it receives an article partially enfolded in a wrapper to an upper level, of pivoted tuckers on said table adapted to swing toward each other to engage and tuck said wrapper, and mechanism for adjusting the pivots of said tuckers toward and away from each other to accommodate articles of various lengths.

29. The combination of elements defined in claim 28 combined with automatic means for swinging said pivoted tuckers toward each other while the article is moving into position between them.

30. The combination of elements defined in claim 28 combined with means for mounting and operating said pivoted tuckers including, a rock shaft mounted in said lifter table, means for slidably mounting the pivots of said tuckers upon said rock shaft, coacting means between said rock shaft and said tuckers acting to swing the tuckers upon rocking of the rock shaft and said adjusting mechanism acting to move said pivots and said co-acting mechanism longitudinally of said rock shaft.

31. The combination of elements defined in claim 28 combined with means for mounting and operating said pivoted tuckers comprising a rock shaft mounted in said lifter table, and the means for rocking said rock shaft independent of movement of said lifter table, means for slidably mounting the pivots of said tuckers upon said rock shaft, coacting means between said rock shaft and said tuckers acting to swing the tuckers upon rocking of the rock shaft and said adjusting mechanism acting to move said pivots and said co-acting mechanism longitudinally of said rock shaft.

32. The combination of elements defined in claim 28 combined with additional wrapper folding means, means for adjusting said additional wrapper folding means and the mechanism for adjusting the pivots of the tuckers coacting with said means for adjusting the additional wrapper folding means at one location of the lifter table only.

33. The combination of elements defined in claim 28 combined with additional wrapper folding means, means for adjusting said additional wrapper folding means including a movable chain, the mechanism for adjusting the pivots of the tuckers including a sprocket mounted on the lifter table, said sprocket moving into and out of mesh with said chain during movement of the lifter table whereby the tucker pivots are automatically adjusted simultaneously with the additional folding means when said sprocket is in mesh with said chain and said tucker pivots and additional folding means are individually adjusted when the sprocket is out of mesh with said chain.

34. A wrapping machine comprising infeed and outfeed conveyors, an elevator for raising an article to be wrapped from said infeed to the outfeed conveyor, guide means on the infeed conveyor, means for folding wrapping paper about the article and means to simultaneously adjust said guide means and folding means to receive said article.

HOWARD B. TUTHILL.
HARRY F. CALDWELL.